US008849832B2

(12) United States Patent
Ma

(10) Patent No.: US 8,849,832 B2
(45) Date of Patent: Sep. 30, 2014

(54) METHOD AND SYSTEM FOR BUILDING A SUPPORT VECTOR MACHINE BINARY TREE FOR FAST OBJECT SEARCH

(75) Inventor: Yunqian Ma, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 1479 days.

(21) Appl. No.: 12/061,377

(22) Filed: Apr. 2, 2008

(65) Prior Publication Data

US 2009/0254519 A1 Oct. 8, 2009

(51) Int. Cl.
*G06F 7/00* (2006.01)
*G06F 17/30* (2006.01)
*G06K 9/62* (2006.01)
*G06K 9/00* (2006.01)
*G06F 17/00* (2006.01)

(52) U.S. Cl.
CPC ........ *G06F 17/30259* (2013.01); *G06K 9/6253* (2013.01); *G06K 9/6269* (2013.01); *G06K 9/00771* (2013.01); *G06K 9/6282* (2013.01); *Y10S 707/914* (2013.01); *Y10S 707/915* (2013.01)
USPC ........... 707/741; 707/769; 707/778; 707/797; 707/914; 707/915

(58) Field of Classification Search
CPC ................ G06K 9/46; G06F 17/30811; G06F 17/30781
USPC ........... 707/741, 999.001–999.005, 769, 778, 707/797
See application file for complete search history.

(56) References Cited

U.S. PATENT DOCUMENTS

| 5,634,087 | A | * | 5/1997 | Mammone et al. | 706/25 |
| 6,128,608 | A | | 10/2000 | Barnhill | 706/16 |
| 6,327,581 | B1 | | 12/2001 | Platt | 706/12 |
| 6,427,141 | B1 | | 7/2002 | Barnhill | 706/16 |
| 6,658,395 | B1 | | 12/2003 | Barnhill | 706/16 |
| 6,714,909 | B1 | * | 3/2004 | Gibbon et al. | 704/246 |
| 6,741,983 | B1 | * | 5/2004 | Birdwell et al. | 707/999.002 |
| 7,089,241 | B1 | | 8/2006 | Alspector et al. | 707/7 |
| 7,124,149 | B2 | * | 10/2006 | Smith et al. | 707/999.001 |
| 7,283,984 | B1 | | 10/2007 | Thampy et al. | 706/45 |

(Continued)

OTHER PUBLICATIONS

10.B. Fei and J. Liu "Binary tree of SVM: A new fast multiclass training and classification algorithm", IEEE Trans. Neural Netw., vol. 17, pp. 696 2006.*

(Continued)

*Primary Examiner* — Kannan Shanmugasundaram
(74) *Attorney, Agent, or Firm* — Kermit D. Lopez; Luis M Ortiz; Ortis & Lopez, PLLC

(57) ABSTRACT

Method and system for building a support vector machine binary tree for fast object search. An appearance model can be generated for objects in a database and computed on regions detected in an image frame. A covariance matrix can be utilized for representing the appearance model of the detected regions. The covariance matrix appearance model can be preprocessed and/or transferred into a vector-based format. The data in the vector-based format can be added with a class label to form labeled data. A support vector machine (SVM) can be utilized on the labeled data to generate a classifier with an optimal hyperplane and a margin area in order to hierarchically build a balanced SVM binary tree. A query appearance model can be searched rapidly utilizing the SVM binary tree during a search phase.

14 Claims, 13 Drawing Sheets

(56) References Cited

U.S. PATENT DOCUMENTS

| | | | | |
|---|---|---|---|---|
| 7,318,051 | B2 | 1/2008 | Weston et al. | 706/12 |
| 7,734,097 | B1* | 6/2010 | Porikli et al. | 382/190 |
| 2003/0172043 | A1* | 9/2003 | Guyon et al. | 706/48 |
| 2006/0133666 | A1* | 6/2006 | Liu et al. | 382/159 |
| 2006/0253491 | A1* | 11/2006 | Gokturk et al. | 707/104.1 |
| 2007/0177792 | A1 | 8/2007 | Ma et al. | 382/155 |
| 2007/0177819 | A1 | 8/2007 | Ma et al. | 382/284 |
| 2007/0255755 | A1* | 11/2007 | Zhang et al. | 707/104.1 |
| 2008/0002856 | A1 | 1/2008 | Ma et al. | 382/103 |
| 2008/0031491 | A1 | 2/2008 | Ma et al. | 382/103 |

OTHER PUBLICATIONS

25. S. Pang, D. Kim, and S. Y. Bang, "Face membership authentication using svm classification tree generated by membership-based IIe data partition", IEEE Trans. Neural Netw., vol. 16, No. 2, pp. 436-446, 2005.*

Y. Bazi and F. Melgani "Toward an optimal SVM classification system for hyperspectral remote sensing images", IEEE Trans. Geosci. Remote Sens., vol. 44, pp. 3374 2006.*

Chen, Y., Crawford, M., Ghosh, J.: Integrating support vector machines hierarchical output space decomposition framework. In: IGARSS (2004).*

J. Li, N. Allinson, D. Tao and X. Li "Multi-training support vector machine for image retrieval", IEEE Trans. Image Process., vol. 15, pp. 3597 2006.*

F. Melgani and L. Bruzzone, "Classification of hyperspectral remote sensing images with support vector machines," IEEE Trans. Geosci. Remote Sens., vol. 42, No. 8, pp. 1778-1790, Aug. 2004.*

Lee, K., Byun, H.: A New Face Authentication System for Memory-Constrained Devices. IEEE Transactions on Consumer Electronics, 49(4) (2003) 1214-1222.*

Tejo Krishna Chalasani, Anoop M. Namboodiri, and C. V. Jawahar. Support vector machine based hierachical classi ers for large class problems. In Proc. of the 6th Int. Conf. on Advances in Pattern Recognition (ICAPR), 2007.*

Cheong, S., Oh, S. H., Lee, S.-Y.: Support Vector Machines with Binary Tree Architecture for Multi-Class Classification. Neural Information Processing-Letters and Reviews, vol. 2, N. 3 (2004) 47-50.*

An investigation of Practical Approximate Nearest Neighbor Algorithms; T. Liu, W. Moore, A. Gray, K. Yang; School of Computer Science; Carnegie-Mellon University Searching in Metric Spaces with User-Defined and Approximate Distances; P. Ciaccia, M. Patella; University of Bologna, Italy; ACM Transactions on Database Systems, vol. 27, No. 4, Dec. 2002.

* cited by examiner

METHOD AND SYSTEM FOR BUILDING A SUPPORT VECTOR MACHINE BINARY TREE FOR FAST OBJECT SEARCH

TECHNICAL FIELD

Embodiments relate in general to the field of computers and similar technologies, and in particular to software utilized in this field. Embodiments are also related to data-processing systems and methods. Embodiments additionally relate to search operations in a database or other storage medium. Embodiments further relate to binary tree data structures and techniques for managing and searching such data structures.

BACKGROUND OF THE INVENTION

Various applications such as multimedia, digital libraries, virtual reality and information warehousing require the need for efficient storage and retrieval of objects in database. Objects are often provided in the form of video or image data, which may be detected utilizing various video or image-processing search and detection systems. Many technological advances could have been achieved in connection with such systems in recent years. Such systems and related methodologies, however, continue to still suffer from a slow response time due to the extensive processing required to analyze and search objects in video or image data formats, particularly in the context of image databases. Each object in such a database can be represented by a feature of the object. The feature can be a multidimensional data, which is typically in the form an appearance model of objects. Normally, such an appearance model is provided as an invariant representation of the objects in the database.

Moreover, an image database (e.g., including video database) typically supports the storage and retrieval of objects through the use of a simple linear search method. In a simple linear search method, the training data set is stored, and a distance function is calculated to determine which member of the training data is closest to a query data point. Once the nearest training data has been found, its class label can be predicted for the query data point. A simple linear search method exhibits a large search time, because the time for query one object is proportional to the number of objects stored in the training data set. If the image database possesses a large amount of data, the linear search time is large. So, the problem is the need for efficiently representing the training data set as a tree. A tree-based data structure represents the training data set in a tree. Thus, the search time for a query point on the tree-based data structure can approach O(log(n)) search times, which is faster than linear searches O(n) performed (e.g., in many cases dealing with a large database).

In the majority of prior art tree data structures, the procedure of the parent node splitting into the left child and the right child corresponds to the splitting of a region into two disjoint regions. Such disjoint regions can also overlap with each other in some cases. A technical difficulty encountered in most prior art tree data structures is that there is no mapping from the high-dimensional data into the low-dimensional data such that two objects, which are spatially close in the high-dimensional space, are still close in the low-dimensional space. Therefore, it is desirable to handle high-dimensional data with binary classification problem at less search time.

A need therefore exists for a method and system for building a support vector machine binary tree, which can handle high-dimensional data directly. Such an improved method and system is described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for building a support vector machine binary tree for fast object search.

It is a further aspect of the present invention to provide for a support vector machine binary tree utilized for finding objects in an image and/or video database.

The aforementioned aspects and other objectives and advantages can now be achieved as described herein. An improved method and system for configuring and providing a support vector machine binary tree for a fast object search is disclosed herein. An appearance model can be generated for objects in a database and computed with respect to regions detected in an image frame. A covariance matrix can be utilized for representing the appearance model of the detected regions. The covariance matrix appearance model can be preprocessed and/or transferred into a vector-based format. The data in the vector-based format can then be added with a class label to form labeled data. A support vector machine (SVM) can be utilized with respect to the labeled data to generate a classifier with an optimal hyperplane and a margin area in order to hierarchically construct a balanced SVM binary tree. A query appearance model can also be searched rapidly utilizing the SVM binary tree during a search phase.

The query appearance model can be searched by querying both children during the search phase, if the query data falls within the margin; otherwise an operation can be implemented that involves querying either the left child or the right child. The disclosed system and related methodology can be utilized as an index/search module in a 'query by example' operation.

Such an approach can build up a binary tree structure and query a point utilizing the tree data structure. The system utilizes a support vector machine classification technique for partitioning a parent node's region into respective "child" regions to form the binary tree. Each node in the tree structure contains a hyperplane and a margin. The data in each side of the hyper-plane generally belongs to each "child" in the resulting tree data structure.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
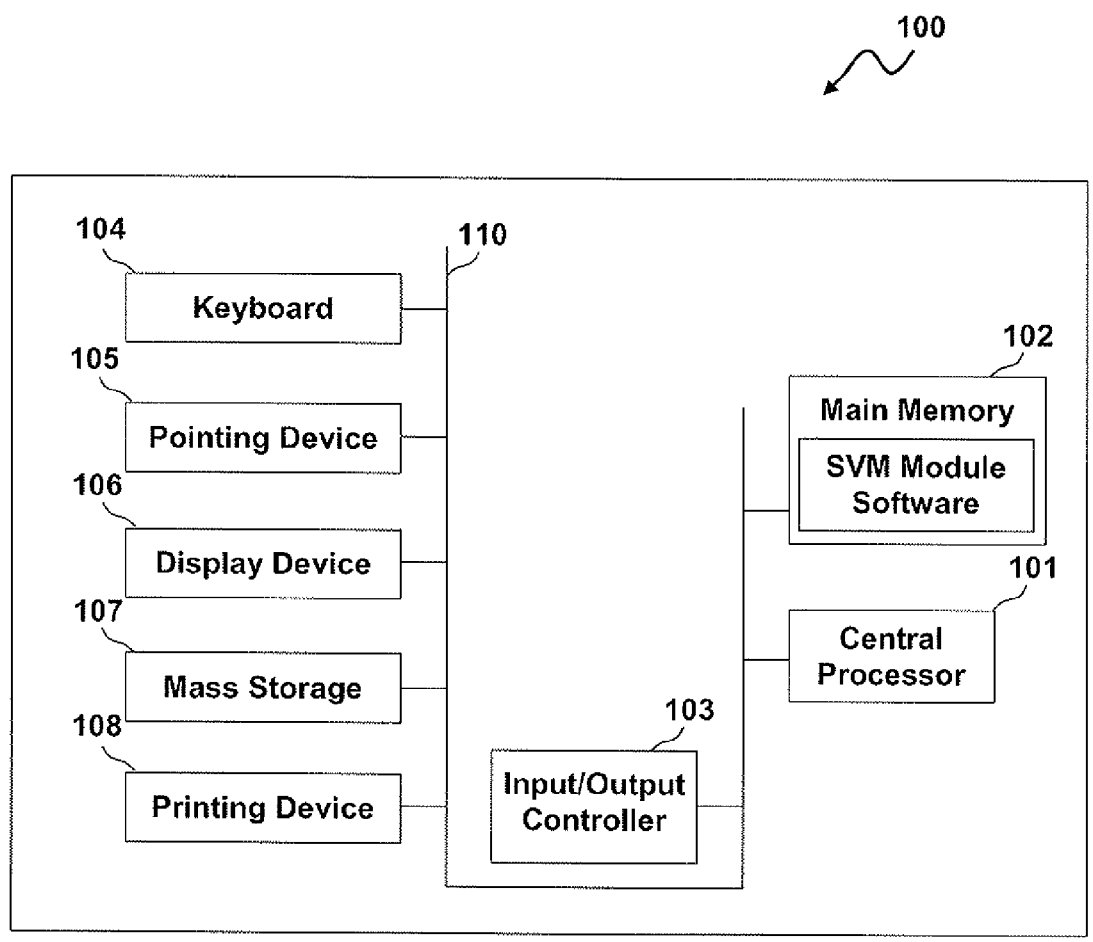
FIG. 1 illustrates a schematic view of a data-processing apparatus in which the present invention may be embodied.
Figure 2:
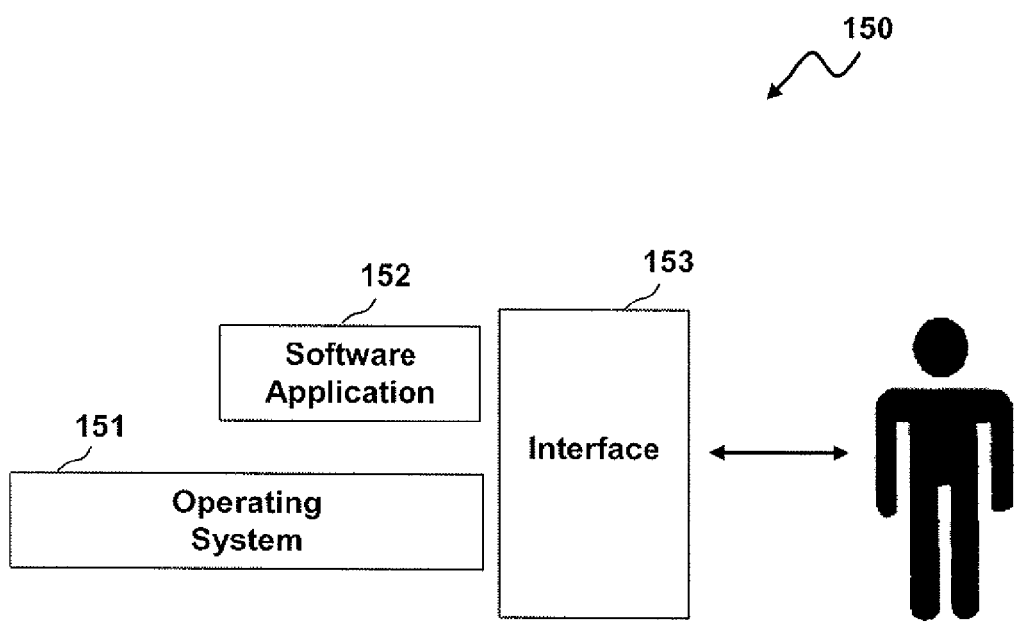
FIG. 2 illustrates a schematic view of a software system including an operating system, application software, and a user interface for carrying out the present invention.
Figure 3:
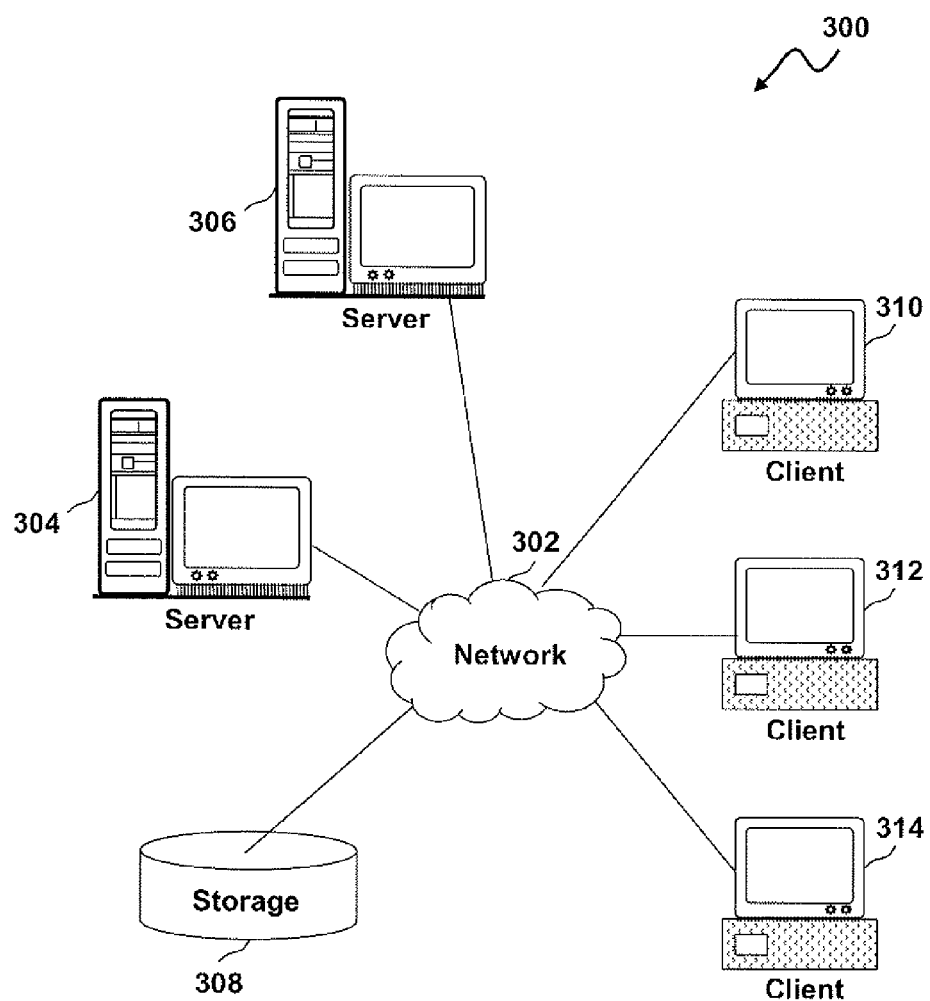
FIG. 3 depicts a graphical representation of a network of data-processing devices in which aspects of the present invention may be implemented.

FIGS. 1-3 are provided as exemplary diagrams of data-processing environments in which embodiments of the present invention may be implemented. It should be appreciated that the configurations depicted in FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture. SVM binary tree programming can be stored in the main memory 102 and executed by the central processor 101. Data-processing apparatus 100 may constitute a server or a group of interconnected servers, depending upon design considerations. For example, data-processing apparatus 100 may constitute servers, such as, for example, servers 304 and 306 depicted in FIG. 3.

Illustrated in FIG. 2, a computer software system 150 is provided for directing the operation of the data-processing apparatus 100 of FIG. 1. Software system 150, which is stored in system memory 102 and on disk memory 107, generally includes a kernel or operating system 151 and a shell or interface 153. One or more application programs, including the SVM binary tree program, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

Figure 4A:
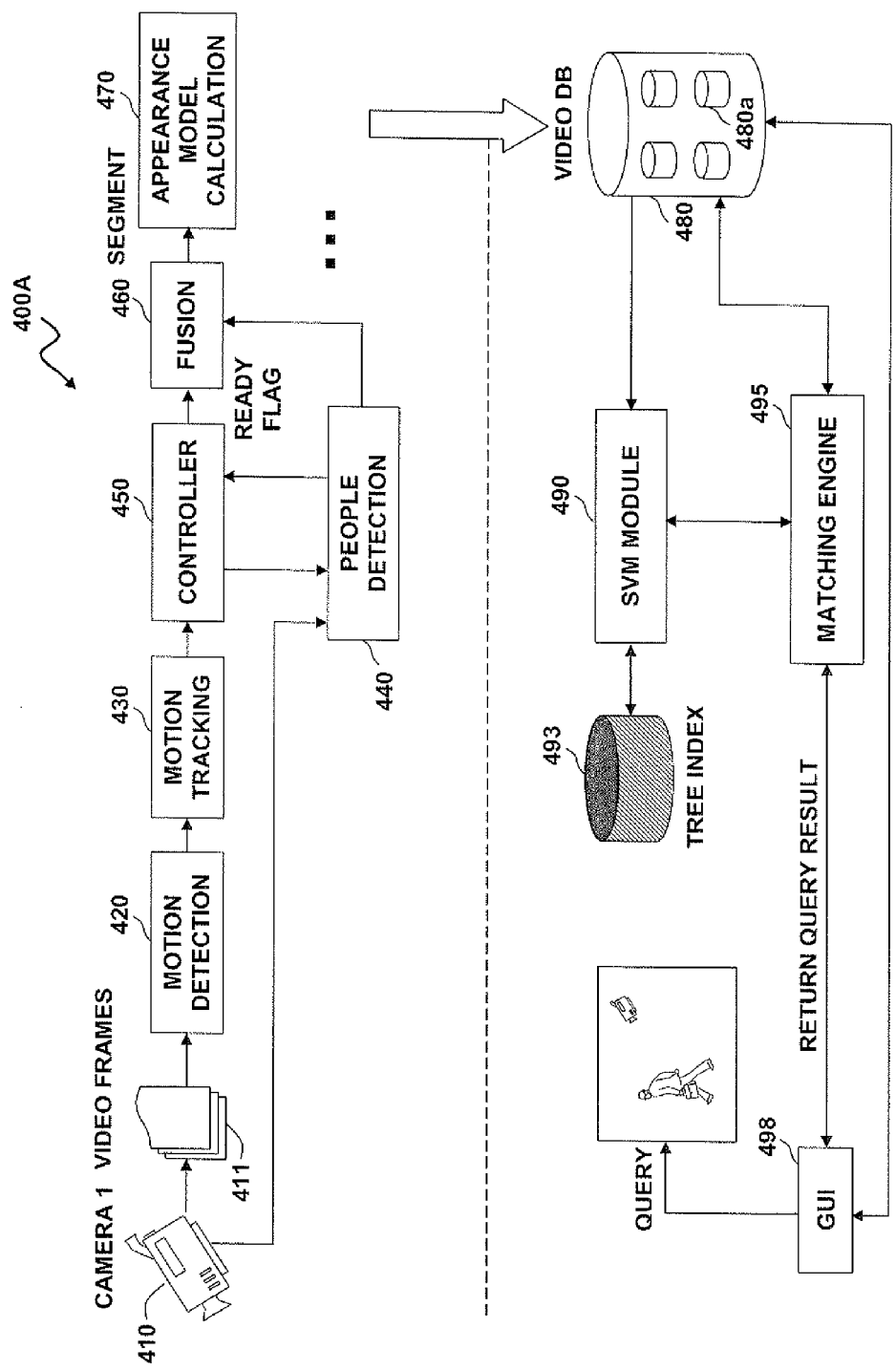
FIG. 4A illustrates a block diagram of an example system for finding archived objects in an image database utilizing a SVM module, in which aspects of the present invention may be implemented.

The interface 153, which is preferably implemented as a graphical user interface (GUI) 498, as illustrated in FIG. 4A, also serves to display results, whereupon the user may supply additional inputs or terminate the session. In some embodiments, operating system 151 and interface 153 can be implemented in the context of a Windows®-based system or another appropriate computer operating system. Window® is a registered trademark of Microsoft Corporation. Application module 152, on the other hand, can include instructions, such as the various operations described herein with respect to the various components and modules described herein, such as, for example, the method 800 depicted in the method(s) 800, 801 of FIGS. 8A-8B.

FIG. 3 depicts a graphical representation of a network of data-processing systems 300 in which aspects of the present invention may be implemented. Network data-processing system 300 is a network of computers in which embodiments of the present invention may be implemented. Note that the system 300 can be implemented in the context of a software module such as application software 152 with SVM tree program. The system 300 includes a network 302 in communication with one or more clients 310, 312, and 314. Network 302 is the medium used to provide communications links between various devices and computers connected together within network data-processing apparatus 100. Network 302 may include connections, such as wire, wireless communication links, or fiber optic cables. Network 302 can further communicate with one or more servers 304 and 306 and a memory storage unit, such as, for example, memory or database 308.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers, which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data-processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data-processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purposes of illustration and not considered a limitation.

Figure 4B:
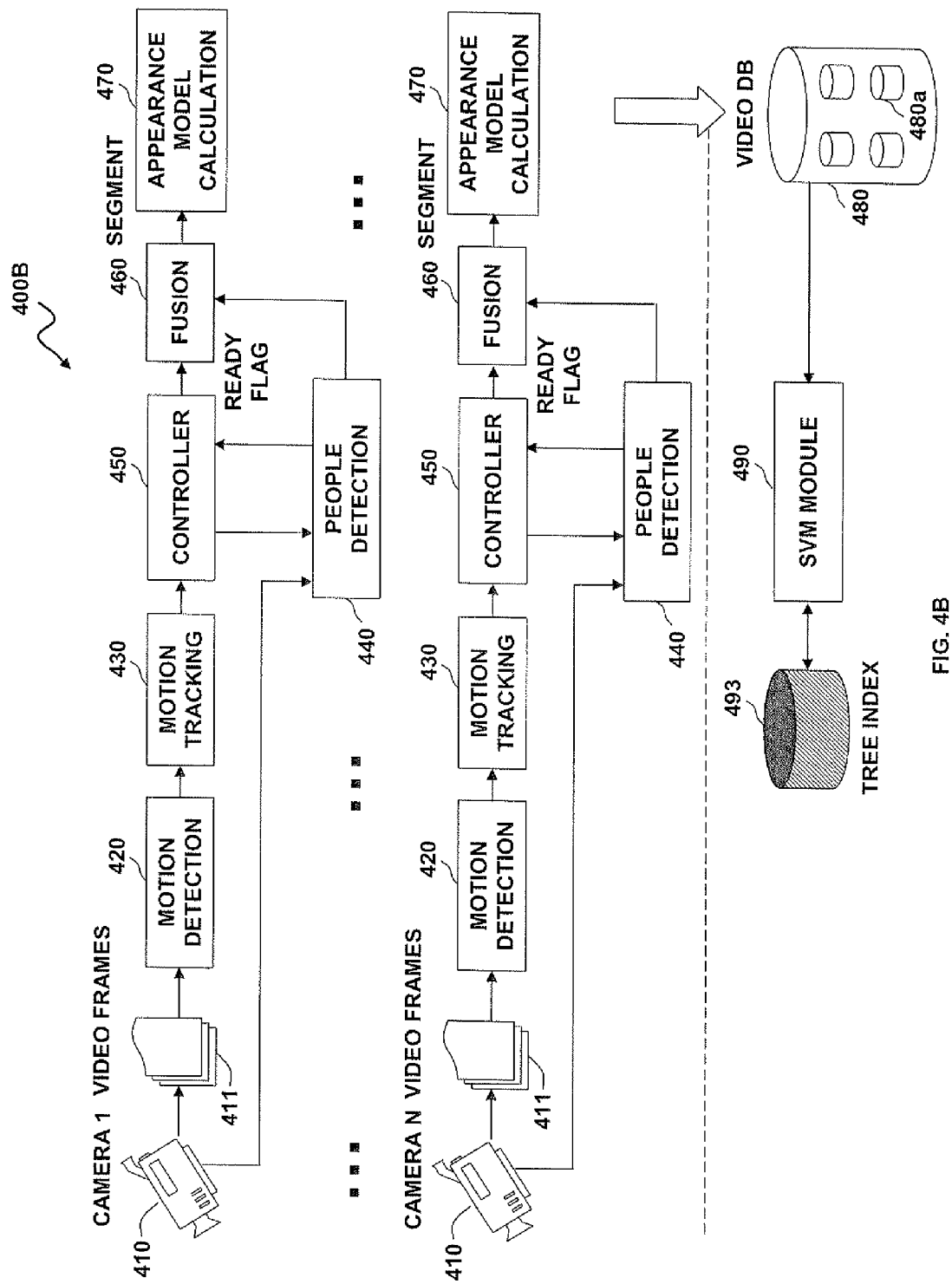
FIG. 4B illustrates an example analytic pipeline of the example system of FIG. 4A, in which aspects of the present invention may be implemented.

FIG. 4A illustrate a block diagram of an example system 400A for finding archived objects in an image database 480 utilizing SVM module 490, in which aspects of the present invention may be implemented. The system 400A can be designed as a video query-by-example system. The system 400A can be configured such that a camera 410, video frames 411, a motion detection processor 420, a motion tracking processor 430, a controller 450, a people detection processor 440, a fusion processor 460, and an appearance model generator processor 470 form an analytics pipeline 400B of the system 400A. A graphical illustration of an example embodiment of an analytics pipeline 400B is illustrated in FIG. 4B. Note that in FIGS. 1-11 identical parts or elements are generally indicated by identical reference numerals.

Figure 4C:
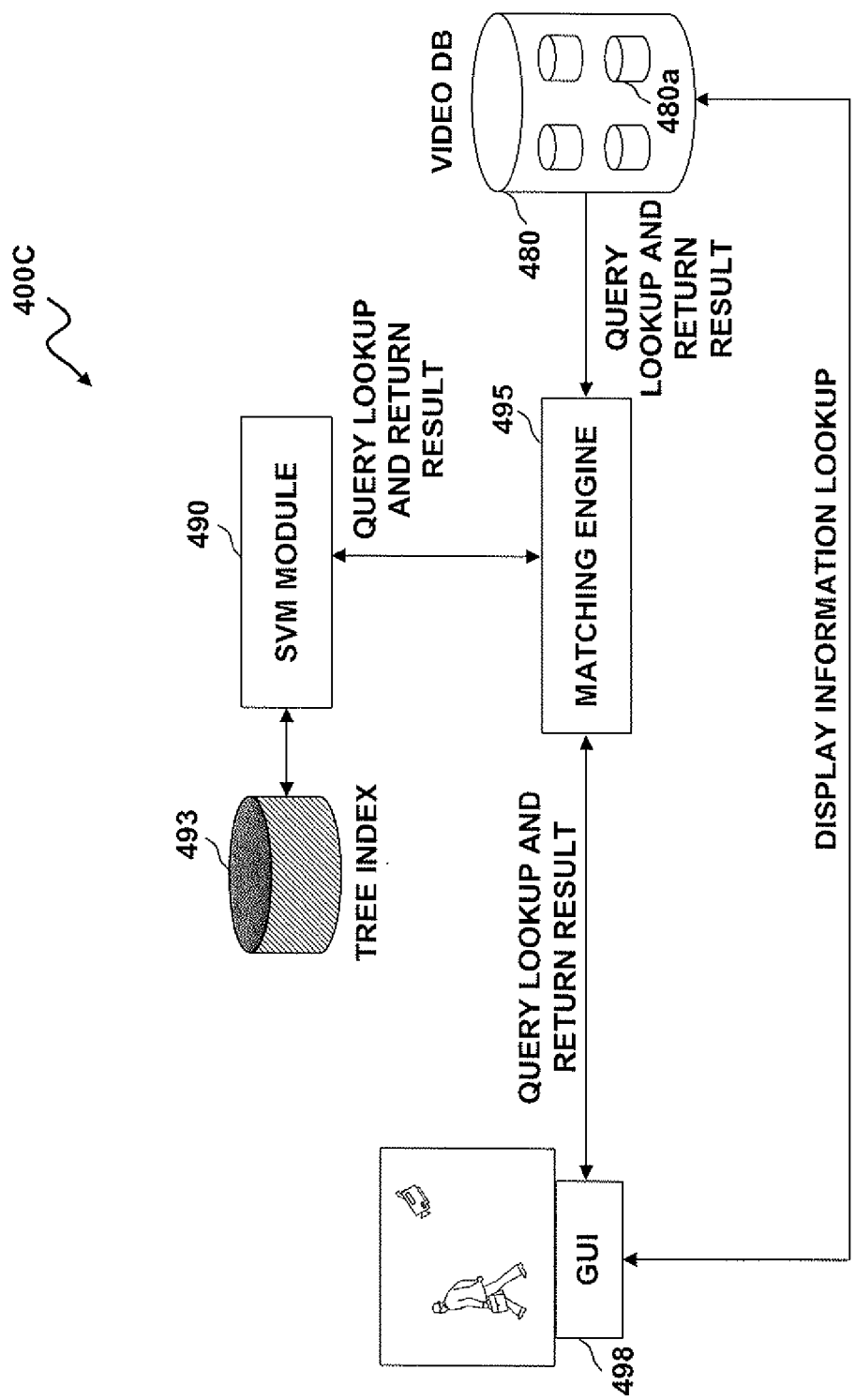
FIG. 4C illustrates an example data index pipeline of the example system of FIG. 4B, in which aspects of the present invention may be implemented.

The system 400A can also be configured such that a database 480, a support vector machine (SVM) module 490, a matching engine 495 and a graphical user interface (GUI) 498 form a data index pipeline 400C. A graphical illustration of an example embodiment of a data index pipeline 400C is illustrated in FIG. 4C. The database 480 can be a distributed database including a number of databases 480a. The system 400A can include both an analytics pipeline 400B and a data index pipeline 400C. As an example, the analytics pipeline 400B can analyze incoming video data from the camera 410, detect motion via the motion detection processor 420, track the motion via the motion tracking processor 430, and detect people in the video data via the people detection processor 440.

Figure 6:
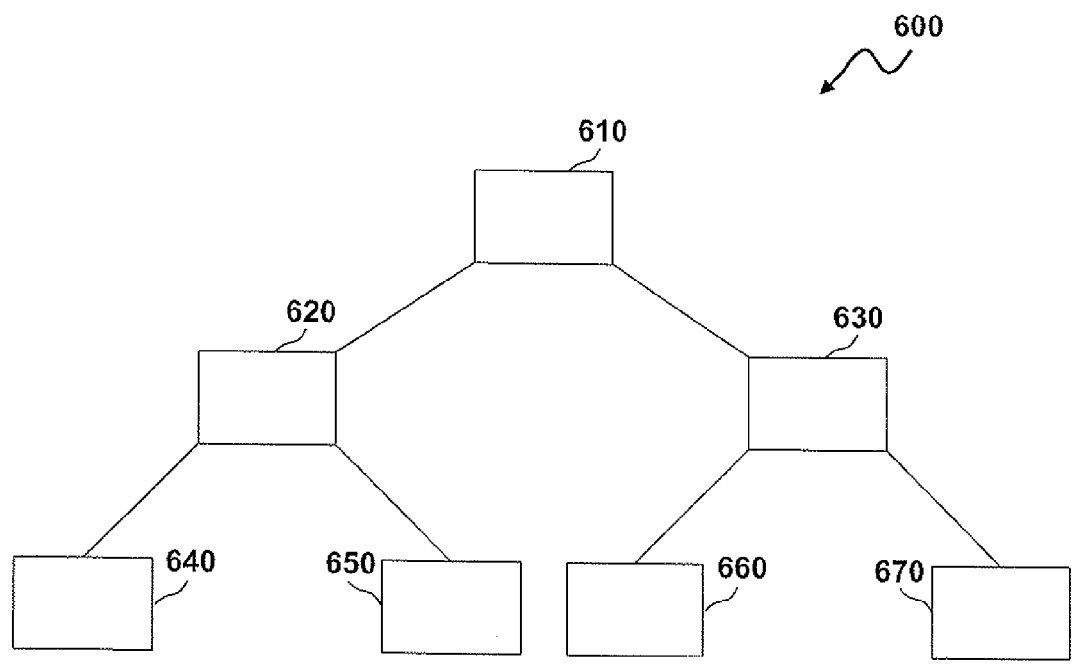
FIG. 6 illustrates an example of a SVM binary tree, in accordance with a preferred embodiment.

The controller 450 can accept input from the motion detection processor 420, the motion tracking processor 430 and the people detection processor 440, and provide output to the fusion processor 460. An appearance model including a number of features of the detected person can be generated by the appearance model generator processor 470, and the appearance model can be stored in the database 480. As an example, the data index pipeline 400C includes the database 480 that further includes a balanced binary tree 600, as illustrated in FIG. 6, which serves as an index of the video data in the database 480.

In addition, the system 400A can be further configured so that a tree-based index 493 receives data from the database 480 to build a tree-based fast search structure 600. Each object consists of an index such as an object ID and its appearance model related to image features. The index can be stored in the tree based data structure 600, whereas the appearance model can be stored in the database 480. The SVM module 490 can be configured to search the tree based data structure 600, and traverse through the binary tree 600 in a more efficient and faster manner than a linear search of a typical storage. For example, the search time of tree-based search in the SVM module 490 can be O(log(n)), where n is the number of objects stored in the database 480. The SVM module 490 can be a new methodology for predictive learning with finite samples. The model complexity can be controlled independently of the dimensionality of the data. The binary tree 600 can be developed based on SVM classification 700, as illustrated in FIG. 7, in the SVM module 490.

For example, the SVM classification 700 can be done utilizing standard (binary) classification formulation under the general setting for predictive learning. Initially, mapping x→y can be estimated in order to classify future samples for given finite sample data $\{x_i, y_i\}$, $i=1, \ldots, n$, $x \in R^d$ and $y \in \{+1, -1\}$. The set of approximating functions $f(x,w)$, $w \in \Omega$ is a set of indicator functions (e.g. $f(x)=\text{sign}(g(x))$, where $g(x)$ is a decision function. Assuming that the data is linearly separable, then, many separating hyper-planes ($g(x)=w \cdot x + b$) should satisfy the constraints shown in equation (1.1):

$$y_i(w \cdot x_i + b) \geq 1, i=1, \ldots, n \qquad (1.1)$$

Figure 7:
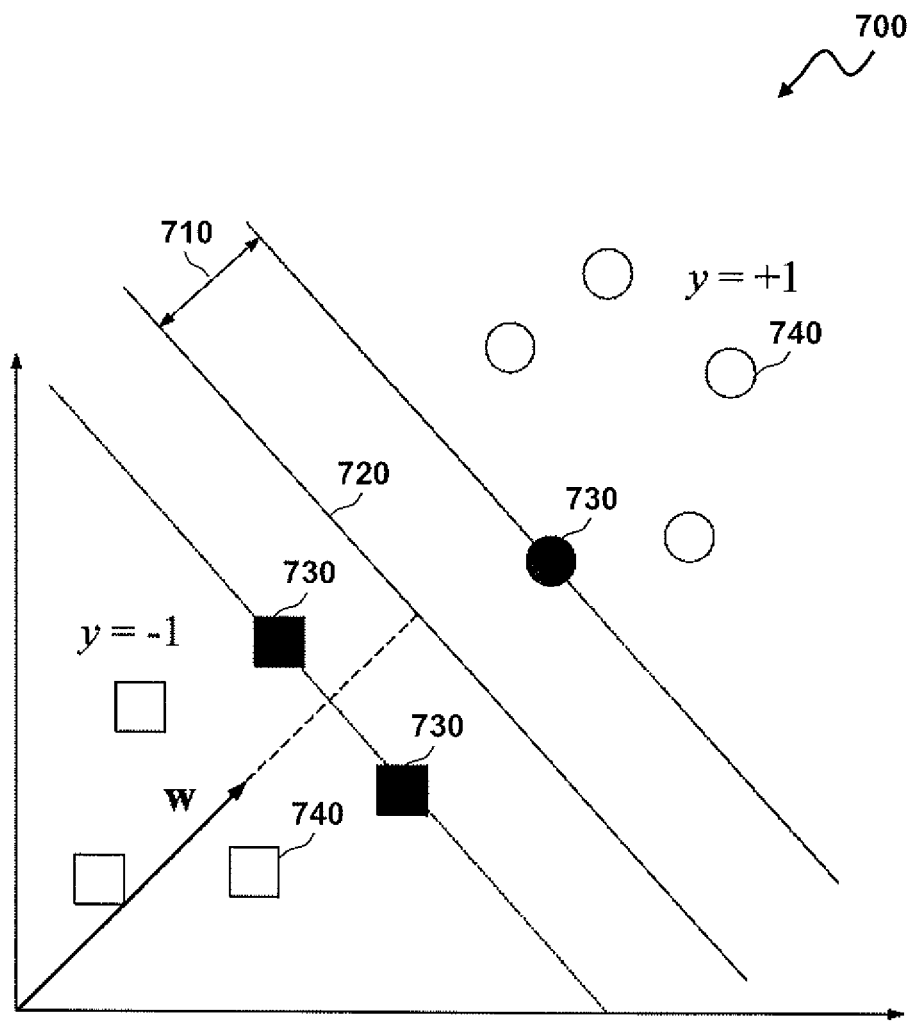
FIG. 7 illustrates an example of a support vector machine classification, hyperplane and margin, in accordance with an alternative embodiment.

The SVM module 490 considers an optimal separating hyperplane 720, as shown in FIG. 7, for a given data set, and a margin 710 can be maximized for the optimal hyper plane 720. The margin 710 is a distance between the closest solid data points 730 to the hyperplane 720. The SVM module 490 can implement structural risk minimization (SRM) inductive principle by keeping the value of empirical risk fixed, i.e. zero for separable case, and by minimizing the confidence interval, i.e. by maximizing the margin.

Also, maximization of the margin 710 is equivalent to minimization of $\|w\|$. In addition, the notion of margin 710 can be extended to the linearly non-separable case, by introducing non-negative slack variables $\xi_i \geq 0$. Then, the formulation forms a 'soft margin' SVM classifier illustrated by equation (1.2):

$$\text{minimize } \frac{1}{2}\|w\|^2 + C\sum_{i=1}^{n} \xi_i \qquad (1.2)$$

$$\text{subject to } y_i(w \cdot x_i + b) \geq 1 - \xi_i, i = 1, \ldots, n$$

where, the regularization parameter C is a constant determining the trade-off between two conflicting goals such as minimizing the training error and maximizing the margin 710.

The solution only depends on support vectors in the optimal hyperplane 720. The optimal hyperplane 720 can bisect the shortest connection between the convex hulls of the two classes. For non-separable case, the optimal hyperplane 720 corresponds to bisection of the shortest connection between two reduced convex hulls. The above-mentioned concept is well known as duality in mathematical programming. It can be shown that direct formulation (1.2) can be equivalently presented in a dual form to find Lagrangian coefficients $\alpha_i$, $i=1, \ldots, n$, which maximize the quadratic form, as indicated in equation (1.3) below:

$$W(\alpha) = \sum_{i=1}^{n} \alpha_i - \frac{1}{2} \sum_{i,j=1}^{n} y_i y_j \alpha_i \alpha_j (x_i \cdot x_j) \quad (1.3)$$

$$\text{subject to } \sum_{i=1}^{n} \alpha_i y_i = 0,$$

$$0 \le \alpha_i \le C, i = 1, \ldots, n$$

Then, w can be calculated by using $$g(x) = \sum_{i=1}^{n} \alpha_i y_i (x \cdot x_i) + b \quad (1.4)$$

after the Lagrangian coefficients $\alpha_i$ are determined. Thereafter, the bias term b can be calculated by using Karush-Kuhn-Tucker conditions $\alpha_i(y_i(x_i \cdot w+b)-1+\xi_i)=0$. The formulation (1.3) exhibits the solution in the form of equation (1.4) as follows:

$$w = \sum_{i=1}^{n} \alpha_i y_i x_i,$$

In the equation (1.4), the sample points with non-zero coefficients $\alpha_i$ are called support vectors. These support vectors can be with respect to the solid points 730 depicted in FIG. 7.

Figure 5:
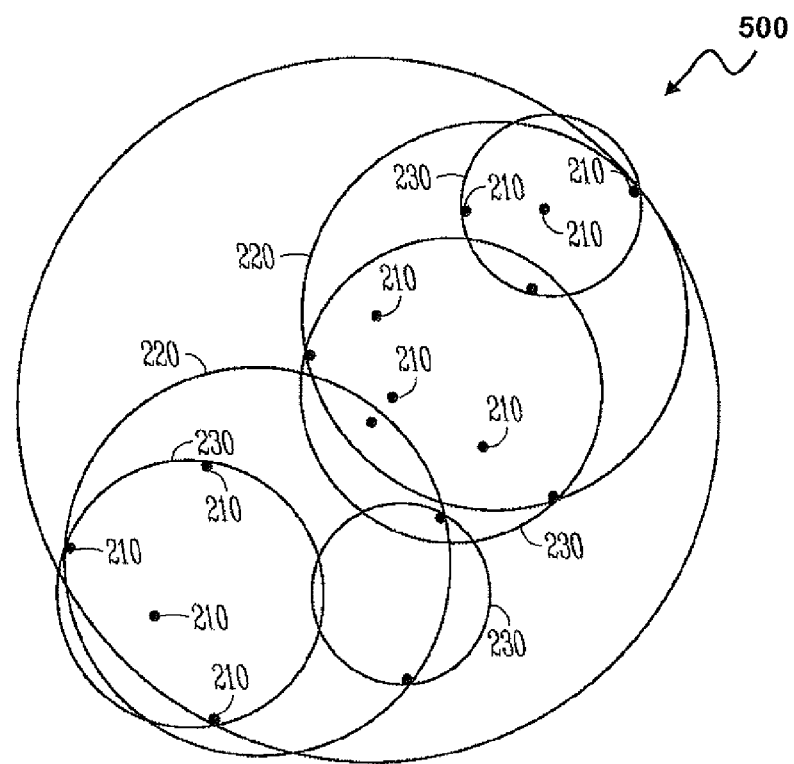
FIG. 5 illustrates an example of building a balanced SVM binary tree in graphical form, in accordance with a preferred embodiment.

FIG. 5 illustrates an example of building a balanced SVM binary tree 600 in graphical form, in accordance with a preferred embodiment. The circle 500, as illustrated in FIG. 5 includes a number of data points 210 that represent appearance models of all of the objects. The circle 500 can correspond to a root node 610 in the SVM binary tree 600, as depicted in FIG. 6. Then, the group 500 can be partitioned into two groups that are represented by the two circles 220. These two groups represented by the two circles 220 are a left child node 620 and a right child node 630 in the tree based data structure 600 in as illustrated in FIG. 6.

The appearance models can be divided again in each space 220, as represented by the four circles 230 in FIG. 5. The four circles 230 correspond to leaf nodes 640, 650, 660 and 670. A tree based data structure 600 can then be constructed as shown in FIG. 6. The support vector machine classification method can be utilized for partitioning the parent node 610 into children nodes 620 and 630. The SVM module 490 can be related to two phases, one is building the tree 600 and the other is searching the tree 600. The time complexity of the search is O(log(n)) for the SVM binary tree 600. It is apparent that an O(log(n)) search is faster than a linear search O(n) on the objects.

The analytics pipeline 400B of the system 400A of FIG. 4B can include a number of cameras or other video sensing devices 410, which is coupled to its own dedicated analytics pipeline 400B. Each dedicated analytics pipeline 400B can then be coupled to the data index pipeline 400C. Such a configuration enables the system 400A to record appearance models of persons or other objects in the database 480 faster than other configurations.

Additionally, the search of the appearance models in the database 480 and/or the distributed databases 480a can then be distributed over several processors. The graphical user interface 498 can permit a user to select a person in an image frame in real time or from a stored sequence of video data in the database 480. The SVM module 490 can query the SVM binary tree 600 a number of times to locate appearance models that are similar to the selected person or object. The matching engine 495 can receive the similar appearance models to determine whether the selected person or object is present in the database 480.

FIG. 7 illustrates a support vector machine classification 700 on the labeled data (trainX, trainY). The results include one hyperplane 720 and one margin area 710. The support vectors are shown as the solid points 730. The margin area 710 is the distance between the closest solid data points 730 to the hyperplane 720. So after support vector machine classification, the initial labeled data has been updated for new label 740. The new label 740 (either +1 or −1) is the results of using support vector machine classification 700 on the initial labeled data. Therefore, the points with +1 label belong to one class and the points with −1 label belong to the other class in accordance with the margin area 710.

Figure 8A:
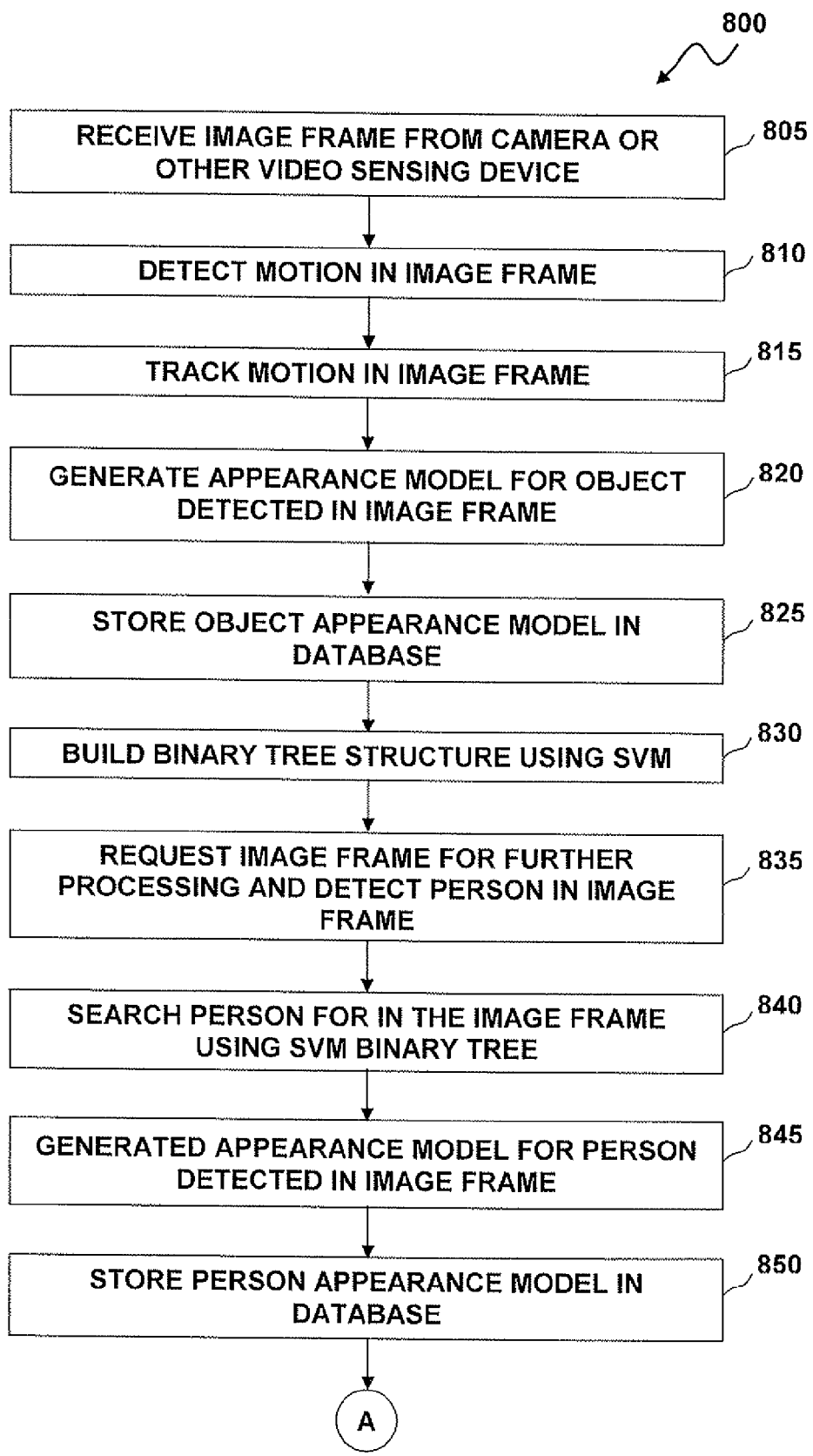
FIGS. 8A-8B illustrate a flow chart illustrative of a method for finding archived objects in an image database utilizing a SVM binary tree, in accordance with a preferred embodiment.
Figure 8B:
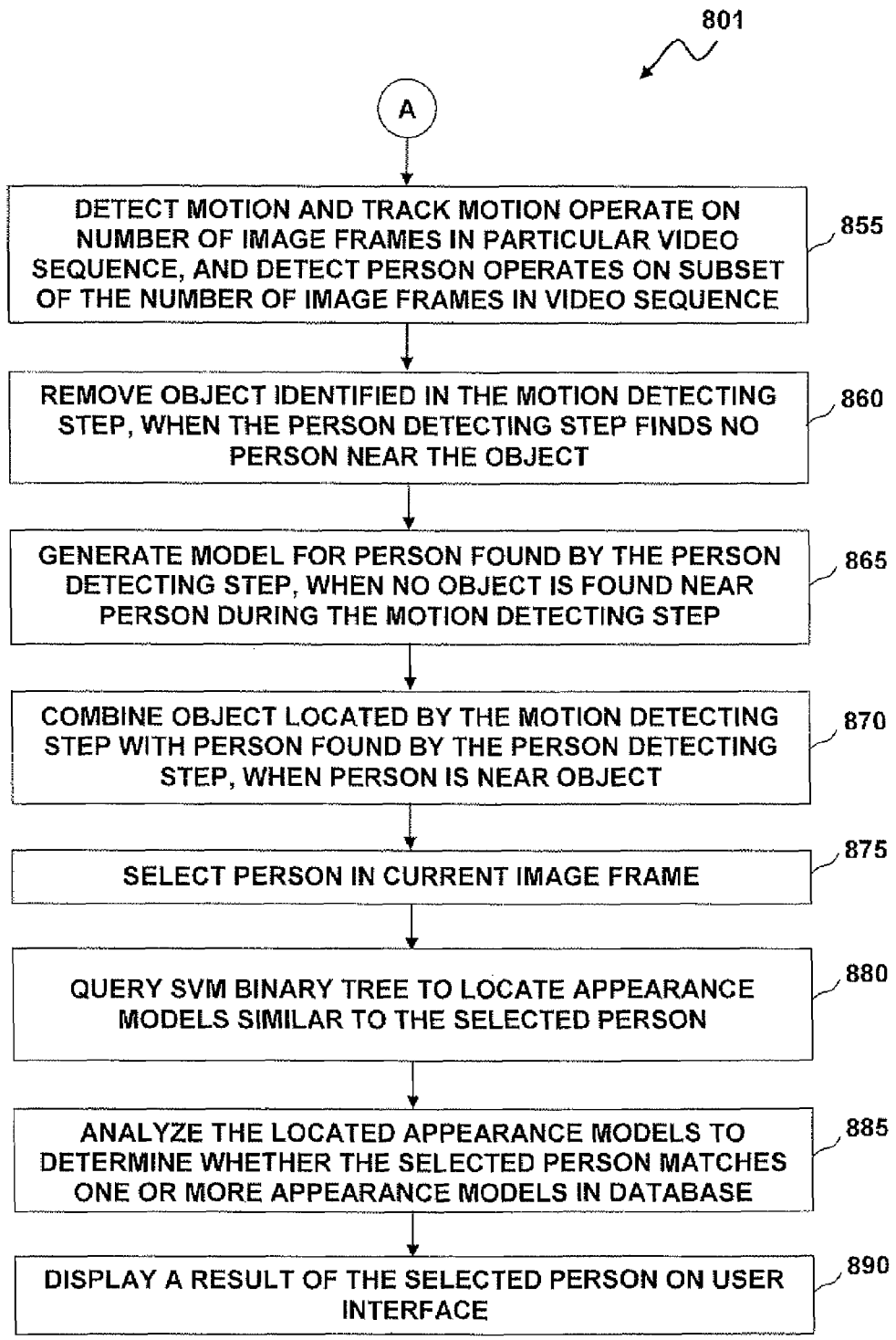

FIGS. 8A-8B illustrate a flow chart illustrative of operations depicting a method 800-801 for finding archived objects in an image database utilizing SVM binary tree 600, in accordance with a preferred embodiment. Note that the method 800-801 can be implemented in the context of a computer-useable medium that contains a program product. The method 800-801 depicted in FIG. 8 can also be implemented in a computer-usable medium containing a program product. As illustrated at block 805, an image frame can be received from the camera or other video sensing device 410. As described at block 810, motion can be detected in the received image frame. As indicated at block 815, the motion in the image frame can be tracked utilizing the motion tracking processor 430. Note that in FIGS. 1-11 identical parts or elements are generally indicated by identical reference numerals. With respect to method(s) 800-801, the method 801 of FIG. 8B represents a continuation via the continuation block "A" of method 800 of FIG. 8A.

As depicted at block 820, an appearance model can be generated for an object detected in the image frame. As illustrated at block 825, the object appearance model can be stored in the database 480. As described at block 830, a binary tree 600 can be built utilizing the SVM module 490, which is explained as detail in FIG. 9. As depicted at block 835, the image frame can be requested for further processing to detect a person in the image frame. As displayed at block 840, a person can be searched utilizing the SVM binary tree 600 in order to generate an appearance model for a person, as illustrated at block 845. As depicted at block 850, the queried person's appearance model can be stored in the database 480. As indicated at block 855, the motion operating on a number of image frames in a particular video sequence can be detected and tracked, and a person operating on a subset of the number of image frames in the video sequence can also be detected.

FIGS. 8A-8B further illustrate at block 860 that the object identified in the motion detecting step can be removed when the person detecting step finds no person near the object. As depicted at block 865, a model can be generated for a person found by the person detecting step even when no object is found near the person. As described at block 870, an object located by the motion detecting step can be combined with a person found by the person detecting step when the person is near the object. Then, a person in a current image frame can be selected as indicated at block 875. As displayed at block 880, the SVM binary tree 600 can be queried to locate appearance models similar to the selected person. As illustrated at block 885, the located appearance models can be analyzed to determine whether the selected person matches one or more appearance models in the database 480. Finally, as depicted at block 890, a result of the selection and query can be displayed on the graphical user interface 498.

Figure 9:
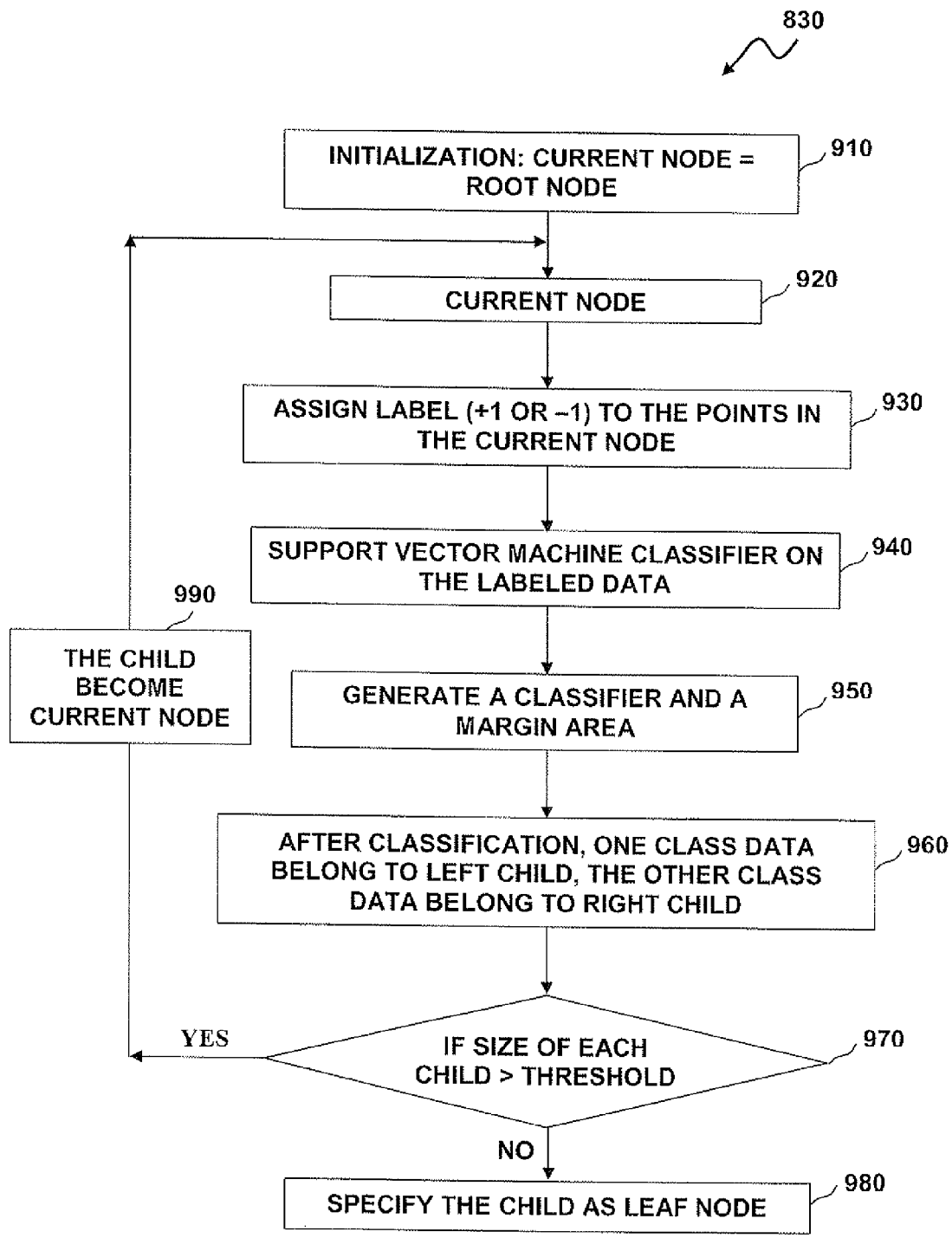
FIG. 9 illustrates a detailed flow chart illustrative of a method for building the SVM binary tree, in accordance with a preferred embodiment.

FIG. 9 illustrates a detailed flow chart illustrative of a method 830 for building a SVM binary tree 600, in accordance with a preferred embodiment. The method 830 can be implemented as a part of overall operation in the method 800 in order to build the SVM binary tree 600. As illustrated at block 910, a current node can be initialized to the root node 610 in the SVM binary tree 600, where the root node 610 represents all points. The SVM binary tree 600 contains leaf nodes 640, 650, 660 and 670, and non-leaf nodes, which also include the root node 610. The current node 610 can be configured to build the SVM binary tree 600, as depicted at block 920. The current node 610 can be partitioned into two subsets, i.e. left child 620 and right child 630, for any non-leaf node v.

Normally, the number of points in each leaf node 640, 650, 660 and 670 is less than a threshold, for example 20 points. The binary tree 600 can be built up from the root node 610 by utilizing the SVM classification 700 to partition into its left child node 620 and right child node 630. Then each child node becomes current node until the size of both the left child node and the right child node is less than the threshold (20 points).

Each object can be represented by a feature vector trainX. The feature vector trainX is the object's appearance model, which is computed on the detected regions. For example, a covariance matrix can be utilized to represent the appearance of the detected regions. The covariance matrix appearance model can be preprocessed into a vector based format. In order to use the SVM module 490. The operation depicted at block 930 involves assigning an initial class label trainY (either +1 or −1) to unlabeled data. It can be appreciated that there can be many methods for initializing class label trainY. Thereafter, as illustrated at block 930, a class label trainY (either +1 or −1) can be assigned to the point trainX in the current node 610 to form labeled data (trainX, trainY), as illustrated in FIG. 7. The labeled data contains positive class label and negative class label.

As described at block 940, a support vector machine can be utilized on the labeled data in order to generate a classifier with an optimal hyperplane 720 and a margin area 710 to hierarchically build a SVM binary tree 600, as illustrated at block 950. The non-leaf node 610, 620 and 630 in the tree contain a hyperplane and a margin area. The leaf nodes 640, 650, 660 and 670 stores the points covered by the leaf node's set. One class data of the hyperplane belong to left child and the other class data of the hyperplane belong to the right child, after classification utilizing the SVM module 490, as described at block 960. As indicated at block 970, the steps 920 to 970 are repeated, if the size of the each child is larger than the threshold. Then, the child becomes the current node 610, as illustrated at block 990. As indicated at block 980, the child can be specified as leaf node 640, 650, 660 and 670, if the size of each child is less than the threshold.

Figure 10:
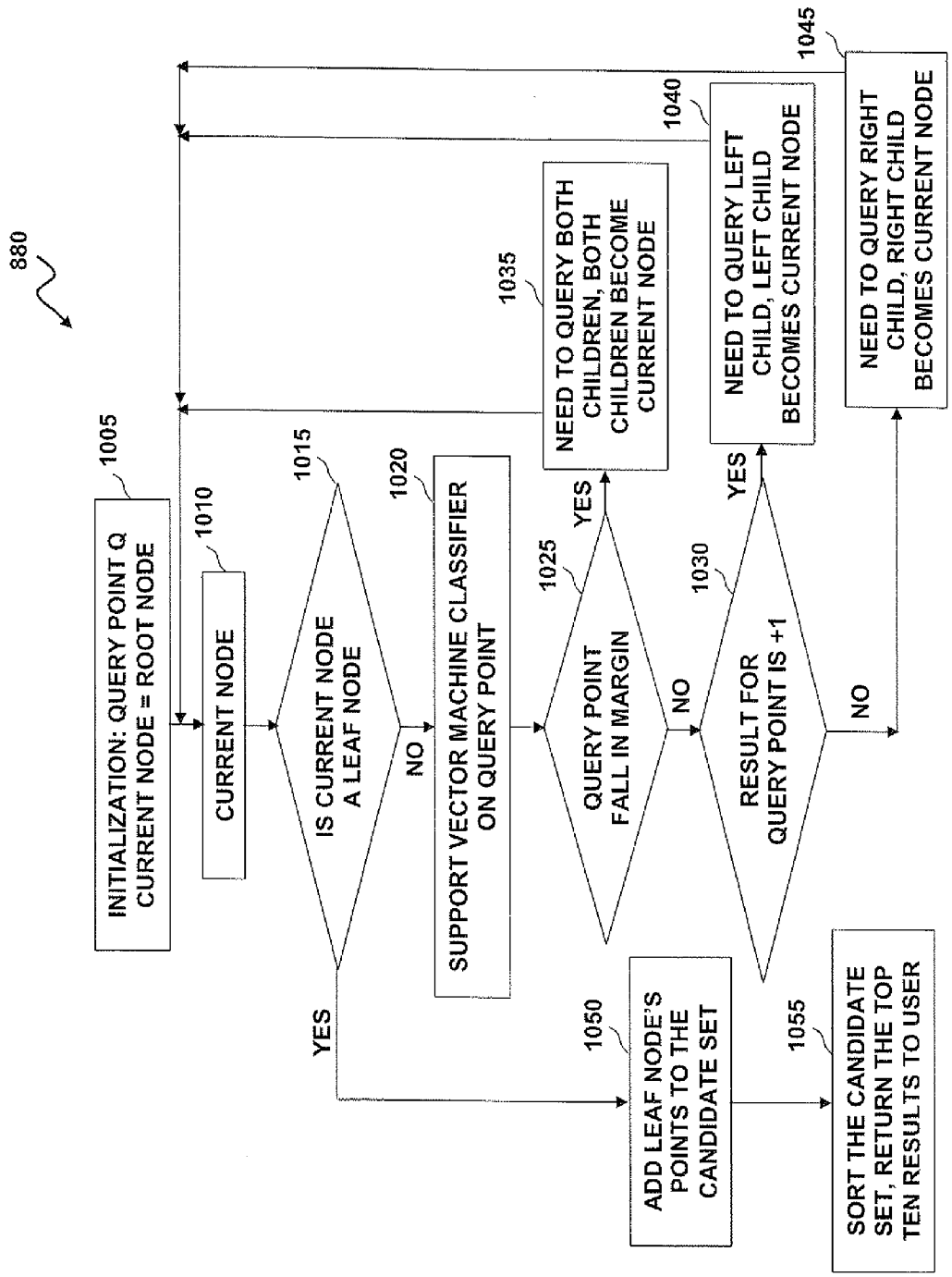
FIG. 10 illustrates a detailed flow chart illustrative of a method for searching a query appearance model utilizing the SVM binary tree, in accordance with a preferred embodiment.

FIG. 10 illustrates a detailed flow chart illustrative of a method 880 for searching a query appearance model utilizing the SVM binary tree 600, in accordance with a preferred embodiment. The method 880 can be implemented as a part in the method 800 in order to search a query appearance model utilizing the SVM binary tree 600. As illustrated at blocks 1005 and 1010, a current node configured with a query point q can be initialized to the root node 610. As depicted at block 1015, determination is made whether the current node 610 is a leaf node or not. Then, as described at block 1020, a support vector machine classifier can be applied on the query point q, if the current node 610 is not a leaf node.

Next, as illustrated at blocks 1025 and 1035, both children can be queried, if the query data fall in the margin 710, since both children are in the current node 610. As described at blocks 1030 and 1040, a left child node 620 can be queried, if the query point is classified as +1 label 740, as illustrated in FIG. 7. Similarly, as depicted at block 1045, a right child node 630 can be queried, if the query point is classified as −1 label 740. As illustrated at block 1050, the leaf node's points can be added to a candidate set, if the search node arrives at a leaf node. Thereafter, as depicted at block 1055, the candidate set can be sorted to return the top ten results to the user. The user selects a blob or a trajectory during the search phase. The blob search starts from the root node 610, traverse the tree 600 and go the leaf nodes.

Figure 11:
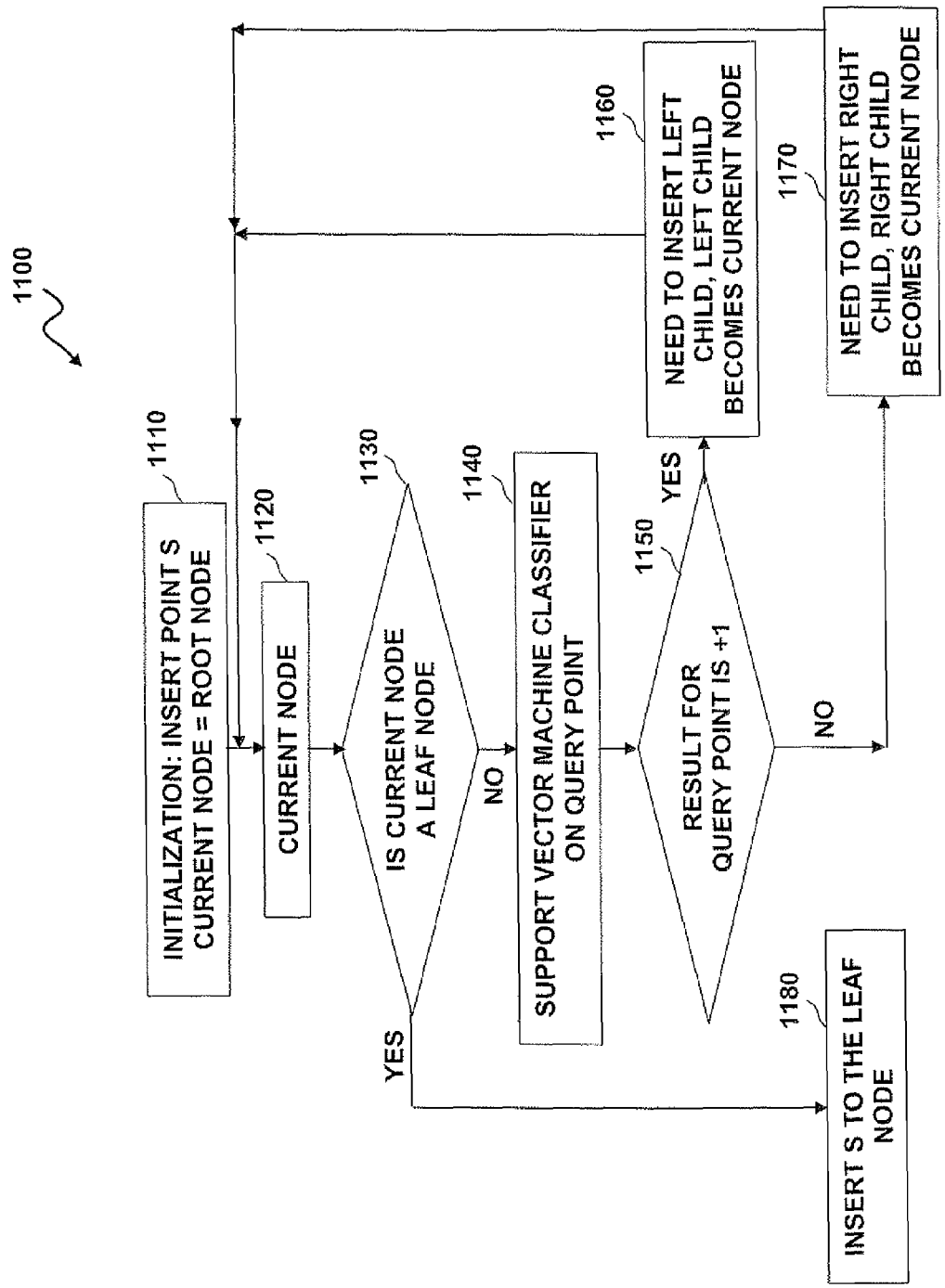
FIG. 11 illustrates a detailed flow chart illustrative of a method for online insertion of points to the SVM binary tree, in accordance with a preferred embodiment.

FIG. 11 illustrates a detailed flow chart illustrative of a method 1100 for online insertion of points to the SVM binary tree 600, in accordance with a preferred embodiment. The SVM binary tree 600 can be utilized as an index/search module in the 'query by example'. As illustrated at blocks 1110 and 1120, the insert point s can be viewed as a query point. It compares with the current node. At the beginning the current node is root node. As described at block 1130, checking can be made whether the current node 610 is a leaf node or not.

Next, as depicted at block 1140, a support vector machine classifier can be applied on the insert query point s, if the current node 610 is not a leaf node. Thereafter, as indicated at blocks 1150 and 1160, a left child node 620 becomes the current node, if the query point is in +1 label 740, as illustrated in FIG. 7. Similarly, as depicted at block 1170, a right child node 630 becomes the current node, if the query point is in −1 label 740. As illustrated at block 1180, if the current node is a leaf node, then insert the point s into the leaf node.

The respective methods and/or models described herein with respect to FIGS. 1-11 can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. For example, system 300 may represent a network such as the "Internet", depending upon design considerations.

It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods and modules described herein with respect to FIGS. 1-11 can be deployed as process software in the context of a computer system or data-processing system as that depicted in FIGS. 1-3 herein, or other data-processing devices, networks and systems.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for configuring and providing a data binary tree for a fast object search, comprising:
   receiving an image frame from a video sensing device;
   receiving image motion data from said image frame from an image motion processor;
   computing at least one appearance model from said received image frame and said received image motion data, representative of an object within said image frame detected in a plurality of regions in said image frame wherein said object is stored in an object database containing a plurality of multidimensional data objects including said object, wherein said at least one appearance model is represented in a covariance matrix;
   storing said appearance model in a database;
   assigning a class label to said at least one appearance model in a vector-based format in order to form labeled data corresponding to each of said appearance models including an object index; and
   utilizing a support vector machine with respect to said labeled data to generate a classifier with an optimal hyperplane and a particular margin; and
   hierarchically constructing a data binary tree utilizing said labeled data for a fast object search thereof;
   automatically searching a query appearance model in said object frame utilizing said data binary tree in accordance with said classifier and said particular margin, such that if a query point of said query appearance model falls within a particular margin, wherein said at least one appearance models and said query appearance model are indexed within said data binary tree;
   querying a left child and a right child of said binary tree in order to obtain a classification result, if a query point of said query appearance model falls within said particular margin; and
   thereafter processing said left child if said classification result is positive or thereafter processing said right child if said classification result is negative.

2. The computer-implemented method of claim 1 further comprising initially generating said at least one appearance model with respect to said plurality of multidimensional data objects contained in said object database.

3. The computer-implemented method of claim 1 further comprising pre-processing said at least one appearance model in said covariance matrix into said vector-based format.

4. The computer-implemented method of claim 1 wherein said data binary tree comprises said support vector machine binary tree containing leaf nodes and at least one root node.

5. The computer-implemented method of claim 1 wherein said object comprises an image contained within said object database and/or video data contained with said object database.

6. A system for configuring and providing a data binary tree for a fast object search, comprising:
   a data bus coupled to a processor; and
   a compute-usable medium embodying computer code, said computer-usable medium being coupled to said data bus, said computer program code comprising instructions executable by said processor and configured for:
   receiving an image frame from a video sensing device;
   receiving image motion data from said image frame from an image motion processor;
   computing at least one appearance model from said received image frame and said received image motion data, representative of an object within said image frame detected in a plurality of regions in said image frame wherein said object is stored in an object database containing a plurality of multidimensional data objects including said object, wherein said at least one appearance model is represented in a covariance matrix;
   storing said appearance model in a database;
   assigning a class label to said at least one appearance model in a vector-based format in order to form labeled data corresponding to each of said appearance models including an object index;
   utilizing a support vector machine with respect to said labeled data to generate a classifier with an optimal hyperplane and a particular margin; and
   hierarchically constructing a data binary tree utilizing said labeled data for a fast object search thereof;
   wherein said instructions are further configured for automatically searching a query appearance model in said object frame utilizing said data binary tree in accordance with said classifier and said particular margin, wherein said at least one appearance models and said query appearance model are indexed within said data binary tree;
   querying a left child and a right child of said binary tree in order to obtain a classification result, if a query point of said query appearance model falls within said particular margin; and
   thereafter processing said left child if said classification result is positive or thereafter processing said right child if said classification result is negative.

7. The system of claim 6 wherein said instructions are further configured for initially generating said at least one appearance model with respect to said plurality of multidimensional data objects contained in said object database.

8. The system of claim 6 wherein said instructions are further configured for pre-processing said at least one appearance model in said covariance matrix into said vector-based format.

9. The system of claim 6 wherein said data binary tree comprises said support vector machine binary tree containing leaf nodes and at least one root node.

10. A non-transitory computer-usable medium embodying computer program code, said computer program code comprising computer executable instructions configured for:
    receiving an image frame from a video sensing device;
    receiving image motion data from said image frame from an image motion processor;
    computing at least one appearance model from said received image frame and said received image motion data representative of an object within said image frame detected in a plurality of regions in said image frame wherein said object is stored in an object database containing a plurality of multidimensional data objects including said object, wherein said at least one appearance model is represented in a covariance matrix;

storing said appearance model in a database;

assigning a class label to said at least one appearance model in a vector-based format in order to form labeled data corresponding to each of said appearance models including an object index; and utilizing a support vector machine with respect to said labeled data to generate a classifier with an optimal hyperplane and a particular margin; and hierarchically constructing a data binary tree utilizing said labeled data for a fast object search thereof;

wherein said embodied computer program code further comprises computer executable instructions configured for automatically searching a query appearance model in said object frame utilizing data binary tree in accordance with said classifier and said particular margin, wherein said at least one appearance models and said query appearance model are indexed within said data binary tree;

querying a left child and a right child of said binary tree in order to obtain a classification result, if a query point of said query appearance model falls within said particular margin; and thereafter processing said left child if said classification result is positive or thereafter processing said right child if said classification result is negative.

11. The computer-usable medium of claim 10, wherein said embodied computer program code further comprises computer executable instructions configured for initially generating said at least one appearance model with respect to said plurality of multidimensional data objects contained in said object database.

12. The computer-usable medium of claim 10 wherein said embodied computer program code further comprises computer executable instructions configured for pre-processing said at least one appearance model in said covariance matrix into said vector-based format.

13. The computer-usable medium of claim 10 wherein said data binary tree comprises said support vector machine binary tree containing leaf nodes and at least one root node.

14. The computer-usable medium of claim 10 wherein said object comprises an image contained within said object database and/or video data contained within said object database.

* * * * *